United States Patent [19]

Elmasry

[11] Patent Number: 4,739,029

[45] Date of Patent: Apr. 19, 1988

[54] POLYMERIC CYANINE DYE

[75] Inventor: Mohamed A. Elmasry, St. Paul, Minn.

[73] Assignee: Minnesota Mining and Manufacturing Company, St Paul, Minn.

[21] Appl. No.: 39,104

[22] Filed: Apr. 16, 1987

Related U.S. Application Data

[62] Division of Ser. No. 710,077, Mar. 11, 1985, Pat. No. 4,680,375.

[51] Int. Cl.$^4$ .............................................. C08G 83/00
[52] U.S. Cl. ..................... 528/149; 528/205; 528/210; 528/211; 528/212; 528/219; 528/373; 528/392
[58] Field of Search ............... 528/149, 205, 210, 211, 528/212, 219, 373, 392

[56] References Cited

U.S. PATENT DOCUMENTS

| | | | |
|---|---|---|---|
| 2,425,772 | 8/1947 | Wilson | 260/240 |
| 2,465,774 | 3/1949 | Wilson | 260/240 |
| 3,245,965 | 4/1966 | Tuemmler | 260/78.4 |
| 3,293,075 | 12/1966 | Wildi | 117/211 |
| 4,100,340 | 7/1978 | Waldmann et al. | 526/245 |
| 4,365,012 | 12/1982 | Hocker et al. | 430/19 |
| 4,582,882 | 4/1986 | Lynn et al. | 526/243 |
| 4,680,375 | 7/1987 | Elmasry | 528/253 |

Primary Examiner—Harold D. Anderson
Attorney, Agent, or Firm—Donald M. Sell; James A. Smith; Lorraine R. Sherman

[57] ABSTRACT

A polymeric tricarbocyanine dye has a rigidized chain having tricarbocyanine polymeric dye units of formula II:

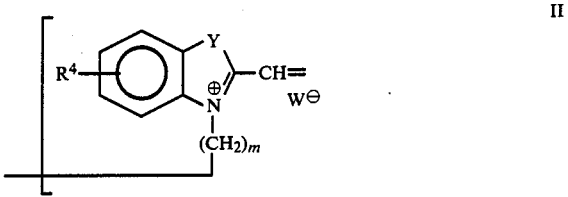

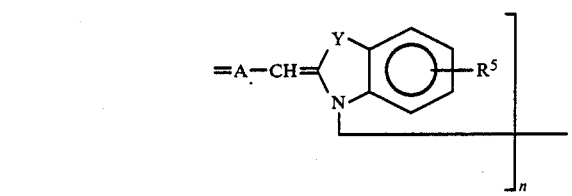

wherein Y is $$-\overset{|}{C}(CH_3)_2,$$

—S—, —Se—, or —O—,

A is

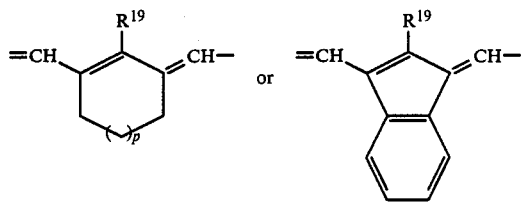

in which $R^{19}$ is alkyl, —Cl, amino, alkyl ($C_1$ to $C_4$) substituted amino, phenyl, or cyclic amino, and
p is 0 or 1,
$R^4$ and $R^5$ independently are —H, $C_6H_5SO_2$—, or $CF_3SO_2$—,
W is a dye anion,
m is an integer 1 to 20, and
n is an integer 2 to 10,000.

14 Claims, No Drawings

POLYMERIC CYANINE DYE

This is a division of application Ser. No. 710,077, filed Mar. 11, 1985, now U.S. Pat. No. 4,680,375.

FIELD OF THE INVENTION

This invention relates to polymeric cyanine dyes containing a high proportion of chromophor units. These compounds are useful as coloring and light-absorbing agents, particularly as light absorbing agents in thin optical recording layers.

BACKGROUND ART

Polymeric dyes are widely disclosed in the literature. Of particular importance is their use as food colorings and in the bulk and surface coloring of plastic objects and textile fibers. Their use as hair dyes, as tinting agents in paper manufacture, and in imaging systems as sensitizing agents is known in the art.

Polymeric monocarbocyanine dyes useful as silver halide sensitizers are disclosed in U.S. Pat. Nos. 2,425,772 and 2,465,774. The cyanine dye moieties are joined by hydrocarbon chains through their ring nitrogens.

In U.S. Pat. Nos. 3,245,965 and 3,293,075 polyphthalocyanines are disclosed to be useful as semiconducting thin films which because of their insolubility must be formed by chemical reaction in situ.

U.S. Pat. No. 4,365,012 discloses photochromic cyclic polyimides for optical recording.

SUMMARY OF THE INVENTION

Briefly, the present invention provides novel polymeric cyanine dyes capable of undergoing thermoplastic deformation by a focused laser beam when in a layer of thickness in the range of 0.1 to 100 micrometers and having an absorption coefficient in the range of 10 to $10^5$ cm$^{-1}$, preferably $10^3$ cm$^{-1}$. They are film-forming, thermally- and light-stable, and solvent-coatable.

The polymeric dyes of the invention are useful as optical recording layers for which purpose they do not require the addition of a binder, but a binder may be useful. The polymeric dye layer when used as an optical recording medium can be a thermoplastic, radiation absorbing layer comprising at least 1 and preferably at least 10 percent by weight of at least one polymeric dye of the instant invention.

Non-chromophoric binders that can be admixed in a layer with the polymeric dyes of the invention in an amount of 0 to 99 percent by weight can be any compatible thermoplastic polymer and having comparable solubility in the coating solvent. For use as an optical recording layer both the polymeric dye and binder, when used, preferably have $T_g$ values in the range of 40° to 250° C.

The polymeric dyes of the invention are capable of absorbing radiation in the red and infrared red range (i.e., 700–900 nm, preferably with peak absorptions in the range of 800–850 nm). The dyes, although sufficiently absorbing of wavelengths in a selective absorption region to allow thermoplastic deformation of the layer by a focused laser beam, are sufficiently stable so as not to be destroyed under these conditions.

It is known in the art to use molecular dyes dispersed in thermoplastic binders for deformation recording (e.g., U.S. Pat. Nos. 4,364,986 and 4,380,769). The use of polymeric dye layers without any binder has the following advantages over that art.

1. High chromophore concentrations can be obtained without the special solubility relationships required between dye and binder.
2. High clarity of the layer is easily obtained thus giving less background noise.
3. The chromophores do not migrate or become lost from the layer during the thermoplastic action, thus facilitating reuse.
4. There is no danger of dye crystallization on storage.
5. Polymeric dyes are frequently more stable to heat than the individual dyes, e.g., IR chromophores.

In general, the polymeric dyes of the invention are linear homopolymers of chromophoric moieties, or linear (as evidenced by lack of solubility in ethanol and methoxyethanol and because the backbone is rigidized) condensed copolymers of chromophoric and non-chromophoric moieties. The chromophoric moieties are joined through their heterocyclic nitrogen atoms through their benzene rings by non-chromophoric units. In the near infra-red region polymers based on heptamethine carbocyanine dyes are valuable. The methine chain is rigidized to improve the stability of the chromophores which are linked in one class by the generic characteristic of heterocyclic nitrogens with an intermediate hydrocarbon chain and in another class by the generic characteristic of a linkage through the 4, 5, 6, or 7 positions of an indolyl or related end group with intermediate sulfonyl groups, hydrocarbon chains, or vinyl groups.

As used in this application:

"thermoplastic deformation" means a stable alteration of the form of a plastic substance under the influence of heat, the altered form being capable of returning to its unspoiled state by further application of heat;

"polymeric dye" means a dye molecule having at least five recurring chromophoric units preferably at least 10 recurring chromophoric units, linked by non-chromophoric units;

"chromophore" means a radiation-absorbing group of atoms that provides a colored molecule;

"rigidized" means stabilized towards photochemical reaction by means such as including part of a methine chain in a cyclic entity;

"methine" means a

group to provide a moiety with alternating single and double bonds;

"tricarbocyanine" or "carbocyanine" means a seven-membered methine chain connecting two heterocyclic nitrogen-containing group where the nitrogen atoms are part of the conjugated chain; and "alkyl", "alkoxy", "alkylamino", and "dialkylamino" mean groups containing 1 to 6 carbon atoms for each "alkyl" unless otherwise specified.

The polymeric cyanine dyes of the present invention as well as condensation polymers and polymers derived from copolymerized ethylenically-unsaturated monomers (disclosed in Assignee's copending patent application, U.S. Ser. No. 710,174 filed Mar. 11, 1985) can be used as optical recording media for the recording of data as is disclosed in Assignee's copending patent application, U.S. Ser. No. 710,175 filed Mar. 11, 1985, filed the same date as the present invention.

DETAILED DESCRIPTION OF THE INVENTION

Polymeric dyes for the practice of this invention comprise a class of polymeric cyanine dyes, as follows:

Tricarbocyanine (also known in the art as heptamethine) polymeric dyes of formulae I and II:

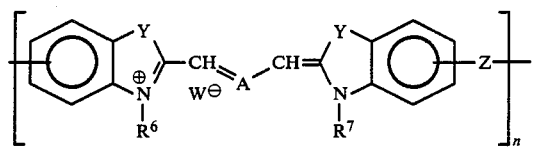

where Y can be

—S—, —Se— or —O—,

A can be

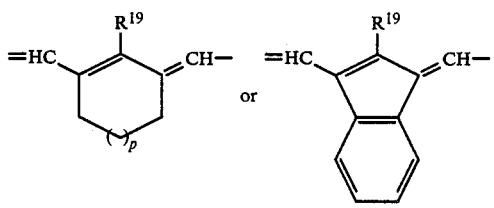

in which $R^{19}$ can be alkyl or —Cl, and p can be 0 or 1, $R^6$ and $R^7$ independently can be alkyl of ($C_1$-$C_{30}$), preferably ($C_1$-$C_{18}$), $R^4$ and $R^5$ independently can be —H, $C_6H_5SO_2$—, or $CF_3SO_2$—, Z can be —$SO_2$—, $-(CH_2)_m-$, or vinylene, W can be $I^-$, $Br^-$, $Cl^-$, $ClO_4^-$, PECHS$^-$ (perfluoroethylcyclohexylsulfonate), $F_3CSO_3^-$ (trifluoromethanesulfonate), or other commonly used dye anions, m is an integer of 1 to 20, and n is an integer of 5 to 10,000.

Preparation of dyes having formulae I and II can be accomplished by condensation of bis-heterocyclic quaternary salts of formulae IIIa and IIIb, below, with a pentamethine bridging-compound selected from formulae IV(a–d), below. A general method and conditions for the preparations are disclosed in U.S. Pat. Nos. 2,425,772 and 3,482,978. For example, a heterocyclic ammonium base containing a reactive group which can be used in cyanine dye condensations such as methyl benzothiazole is reacted with a polyfunctional agent such as propylene dibromide and a bis-type quaternary salt is formed. The resulting salt which now contains two reactive groups can then be subjected to a dye condensation reaction, for instance, with an ortho ester in the presence of an acid binding agent to form a polymeric dye.

Bis-heterocyclic quaternary salts—IIIa and IIIb

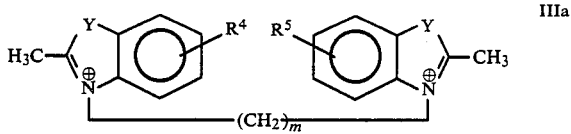

where

Y can be

—S—, —Se—, or —O—,

Z can be —$SO_2$—, or $-(CH_2)_m-$, where m is an integer of 1 to 20, or vinylene, $R^4$ and $R^5$ can be as defined above, W is an anion as defined above, and alkyl can be $C_1$ to $C_{12}$.

The bis-heterocyclic intermediate of formula IIIb wherein Z=—$SO_2$— and

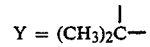

is a novel compound, the preparation of which is illustrated in EXAMPLE 1.

PENTAMETHINE Bridging Compounds—IV (for use in preparation of dyes of Formulae I and II) can be, for example,

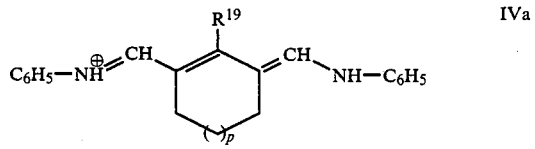

-continued

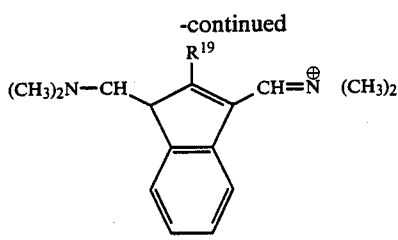
IVd wherein $R^{19}$ can be alkyl ($C_1$–$C_8$), —Cl, amino, alkyl ($C_1$ to $C_4$) substituted amino, phenyl, or cyclic amino (e.g., morphilinyl, piperidyl, pyridinyl, and piperazinyl), and p is 0 or 1 (when p=0, a 5-membered ring is present).

Numerous pentamethine compounds such as those represented by formulae IV are known and methods of their preparations are found in the literature including the following:

(i) Yu. L. Slominskii, I. D. Radchenko, and A. I. Tolmachev, Zhurnal Organicheskoi Khimii, Vol. 14, No. 10, pp. 2214–2221, Oct. 1978; Vol. 15, No. 4, pp. 865–868, April, 1979; Vol. 13, pp. 1189 (1977);

(ii) S. M. Makin, I. I. Boiko, and O. A. Shavrygina, Zhurnal Organicheskoi Khimii, Vol. 13, No. 11, pp. 2440–2433 (Nov. 1977) Vol. 13, No. 6, pp. 1189–1192 (June 1977);

(iii) G. A. Reynolds and K. H. Drexhage, J. Org. Chem., Vol. 42, No. 5, 1977;

(iv) U.S. Pat. No. 4,030,932; and (v) U.S. Pat. No. 3,482,978.

Representative examples of tricarbocyanine dyes having formula I and II are:

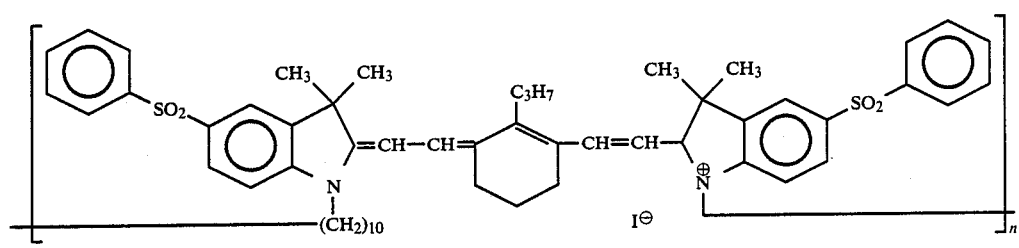

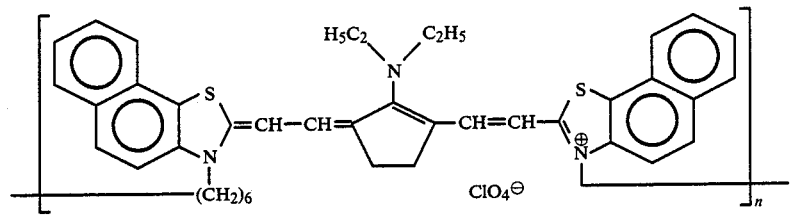

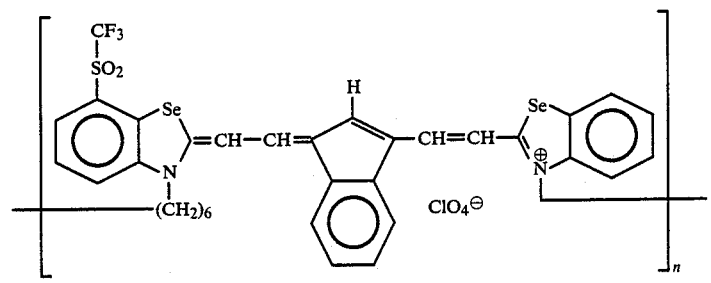

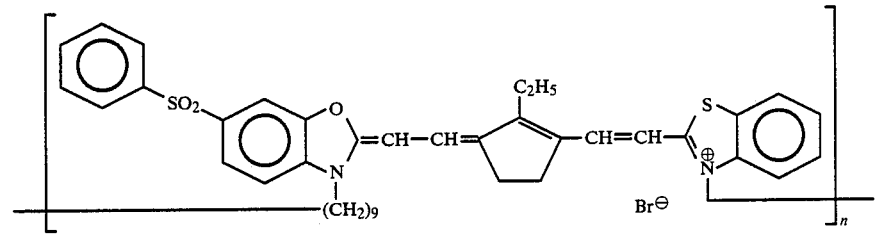

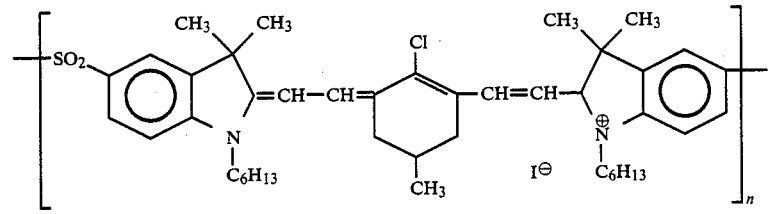

-continued

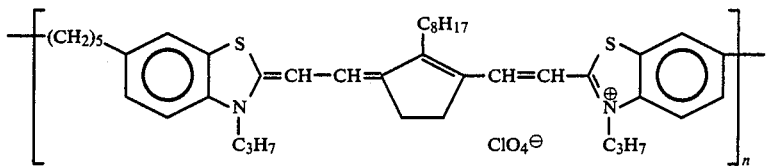

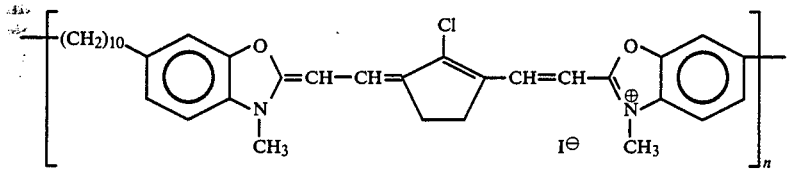

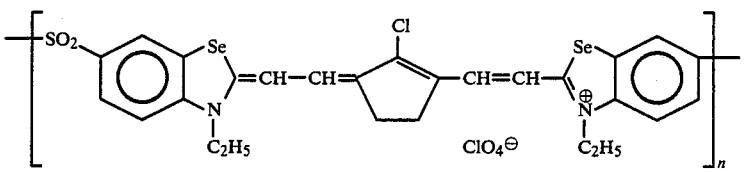

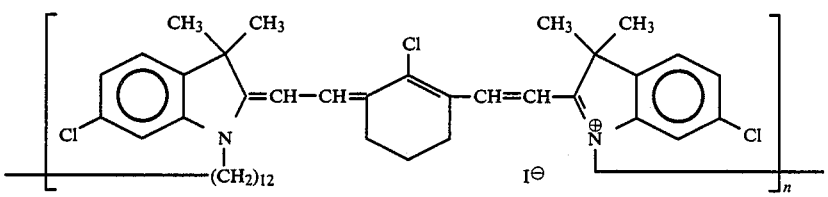

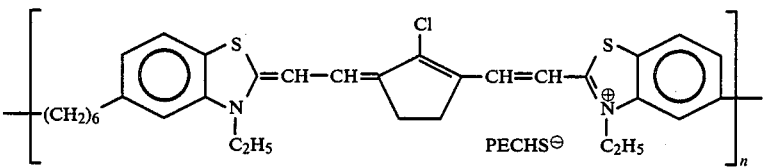

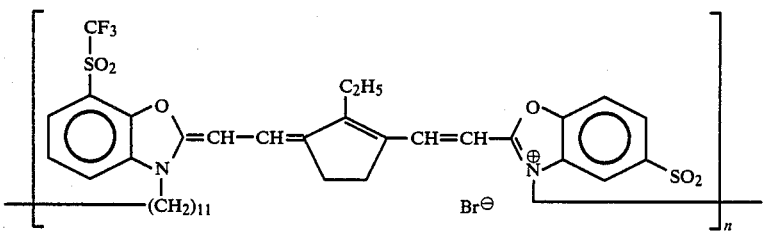

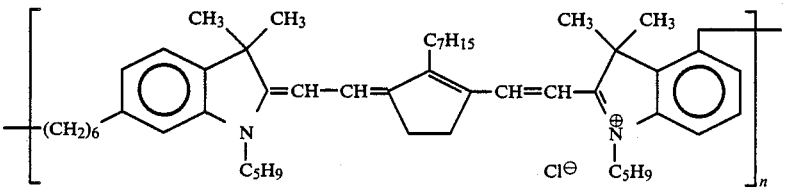

When used as radiation absorbing agents in optical recording layers, the concentration of chromophores in the polymeric dye should be as high as possible in order to attain high absorption coefficients. The physical properties of the polymeric dyes of the invention such as film-forming, non-crystallinity, $T_G$, solvent solubility, adhesion to substrate, etc. were found to be eminently satisfactory.

It is preferable that the chromophore chosen should have a high molar extinction coefficient so that the absorption coefficient of the layer is not unduly limited by the need to copolymerize with nonchromophoric monomers. Tricarbocyanines commonly have molar extinction coefficients in the range of $2 \times 10^4$ to $6 \times 10^5$ or higher.

Although with normal molecular chromophores it is common to describe their light absorbing efficiency by the molar extinction coefficient, it is neither satisfactory nor reliable to use this measure with polymeric materials. A useful measure of the absorption of polymeric dyes in bulk is given by the absorptivity, a, in units $Lg^{-1}cm^{-1}$, where a is expressed in terms of the transmission factor T of a solution of concentration c g/L and thickness d cm is given by $-1/d \cdot c \ln T$. Values in the range of 25 to 250 $Lg^{-1}cm^{-1}$ are obtained with polymeric dyes of the present invention.

The polymeric dyes of this invention should be substantially linear in their form. The acceptable range of polymer chain lengths is also determined by the resultant physical properties, but chains containing 5 chromophore units upwards to about 10,000 chromophore units will be useful. The molecular weight range can be from about 500 to about 1,000,000 but a preferred range is from about 5000 to about 100,000. The most preferred range is from 7,000 to 30,000. The preferred chromophore content is in the range of 40 to 100 mol percent. In optical recording with lasers, it is particularly important to be able to choose the wavelength of peak absorption of the absorbing material to substantially match the laser wavelength. By suitable choice of the chromophores in the present invention, the range covered can be from 650 nm to 1200 nm.

At the exposing laser wavelength within the dye absorption band, the absorption coefficient of the layer should be at least $10^3$ cm$^{-1}$ in order that images may be formed with reasonable laser beam intensities, for example, in the milliWatt range.

In addition to use as light absorbing agents in optical recording layers, the polymeric dyes of the invention can be used as coloring agents in foods, plastics, textile fibers, tinting agents in paper manufacturing, and in coated filter layers.

Objects and advantages of this invention are further illustrated by the following example, but the particular materials and amounts thereof recited in these examples, as well as other conditions and details, should not be construed to unduly limit this invention.

EXAMPLES

EXAMPLE 1

Preparation of the polymeric dye intermediate 5,5'-bis-(1-ethyl-2,3,3 trimethyl-indolenine iodide)sulfone (III-b) (Z=—SO$_2$—,

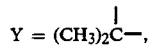

W=I$^-$).

Part (A) bis(4-hydrazinophenyl)sulfone

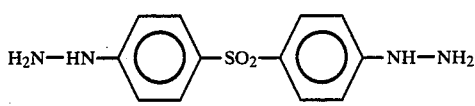

220 mL of 65% hydrazine hydrate was added dropwise in a heated mixture of 57.4 g (0.2 mole) of bis-(4-chlorophenyl)sulfone and 220 mL 2-methoxyethanol at 70° C. After the addition was finished, the temperature of the reaction-mixture was raised to 115° C. and maintained for 24 hours, then filtered to remove dark greenish impurities. The filtrate was diluted with 300 mL water and cooled. A white solid product was collected on a filter and it was washed with cold water to yield 40.0 g of white powder melting at 179°-183° C. with decomposition.

Part (B) 5,5'-bis(2,3,3-trimethylindolenine)sulfone

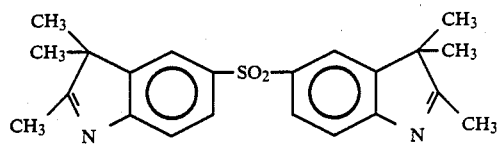

39.00 g of the hydrazine compound was refluxed with 300 mL of methylisopropylketone until all water was removed (approx. 7 hrs). Then the excess ketone was removed by distillation under reduced pressure. The residue was an orange-red, heavy liquid (59–60 g). The crude hydrazone [bis-(4-methylisopropyl-hydrazone-phenyl)sulfone] was dissolved in 120 mL of anhydrous ethanol and heated to 70° C. Then, 190.00 g of ZnCl$_2$ was added portion-wise and the reaction-mixture was kept under N$_2$ for 24 hours. It was poured onto 350 mL ice water containing 16 mL conc. HCl, then blended in a home blender and the yellow-orange powder was collected on a filter (yield, 66.2 g of dry solid). The ZnCl$_2$ salt was refluxed with a mixture of 300 mL CHCl$_3$ and 300 mL of 20 weight percent KOH for ½ hour. The organic layer was separated, washed with water and dried over anhydrous MgSO$_4$. After the removal of CHCl$_3$ under reduced pressure an orange solid was obtained and was crystallized from ethyl acetate/petroleum ether (1:5).

Yield: 22.1 g, melting at 217°–218° C. Elemental analysis confirmed the product to be 5,5'bis(2,3,3-trimethylindolenine)sulfone.

Part (C) the bis-quaternary salt

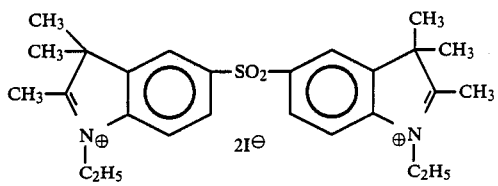

8.5 g (0.025 mol) of 5,5' bis-(2,3,3-trimethylindolenine)sulfone and 15 mL of ethyl iodide were placed in a sealed stainless steel bomb and heated together in an oil bath at 110° C. for 20 hours. The cooled reaction mixture was ground in a mortar and washed with several portions of ether, and then with ethyl acetate.

Yield: 8.00 g of a solid, melting at 150° C. Elemental analysis confirmed the product as the bis-quaternary salt of the part (B) compound.

EXAMPLE 2

Preparation of the polymeric dye intermediate 1,1'-pentamethylene bis-(2,3,3-trimethyl indolenine iodide)-IIIa (R=—H,

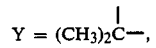

W=I$^-$).

Fifteen grams (0.1 mole) of 2,3,3-trimethylindolenine and 15 g (0.046 mol) of 1,5-diiodopentane were placed in a sealed stainless steel bomb and heated together in an oil bath at 110° C. for 20 hours. The resulting cake was ground in a mortar with acetone. The solid was collected on a filter and washed with more acetone.

Yield: 20.0 g of tan solid, melting at 242°–24° C. (67.5 percent yield).

EXAMPLE 3

Preparation of polymeric cyanine dye

A mixture of 5 mmoles of the bis-heterocyclic quaternaey salt of Example 1, Part (C), 5 mmoles of 2-chlor-1-formyl-3-hydroxymethylenecyclohexene (IV-b), 5 mmoles of sodium acetate, 30 mL acetic anhydride and 15 mL acetic acid was refluxed for 15 min., and then chilled. The resulting solid was precipitated by ether, collected on a filter, washed with water and then alcohol; then purified with 2-methoxyethanol. Using this method with other bis-heterocyclic quaternary salts of formulae III, dyes represented by formulae V or VI were made.

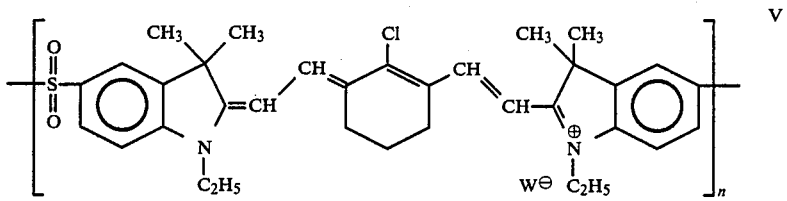

Va (W=I⁻)
Vb (W=ClO₄⁻)
n is an integer of 5 to 10,000.

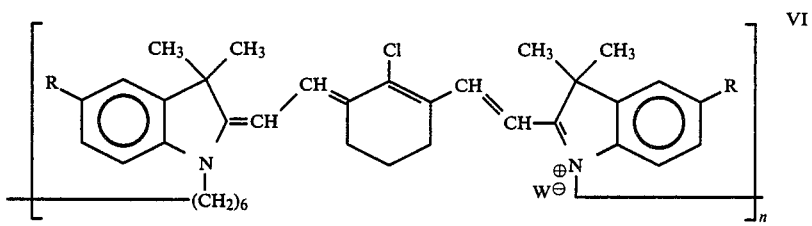

VIa (R=—H, W=I⁻)
VIb (R=—H, W=ClO₄⁻)
VIc (R=C₆H₅SO₂—, W=I⁻)
VId (R=C₆H₅SO₂—, W=ClO₄⁻)
n is an integer of 5 to 10,000.

TABLE I

| | Characteristics of the polymeric tricarbocyanine dyes | | | |
|---|---|---|---|---|
| Compound | $\lambda_{max}$ (nm) in solution | $\lambda_{max}$ (nm) in a thin film | absorptivity a Lg⁻¹cm⁻¹ | decomposition temp. °C. |
| VIII-a | 800-acetonitrile | 818 | 106 | 222 |
| VIII-b | 810-CH₂Cl₂ | 840 | 187 | 255–263 |
| VIII-a | 720, 790-acetonitrile | 822 | 129 | 214 |
| VIII-d | 808-CH₂Cl₂ | 812 | 129 | 228–234 |

EXAMPLE 4

Comparative tests of the polymeric dye of the invention VIa, VIb, VIc, and VId according to Example 3 against three materials known in the art (1) trilayer* disk, (2) photochromic layer disk, (3) thermoplastic layer having soluble dye therein) were made in terms of carrier to noise ratio (C/N) for a range of recording beam power levels. The measurements were carried out using an acousto-optic modulator giving short repetitive pulses of laser light of 50 ns duration at a frequency of 10 MHz. Suitable optics imaged the light onto a layer coated onto each of the disks. The results showed a threshold response characteristic commonly found in trilayer disks as opposed to a broad response of both photochromic and thermoplastic+dye systems. The polymeric dye also showed a carrier to noise ratio of 55 dB which is close to that of the trilayer disk and much higher than the others.

---

*trilayer assembly means a substrate with a coated reflecting layer on which is a transparent dielectric layer and then an absorbing dye layer, the thicknesses being chosen to give optimum absorption and minimum reflection of incident light.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A polymeric tricarbocyanine dye with a rigidized chain having tricarbocyanine polymeric dye units of formula II:

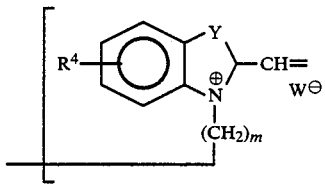

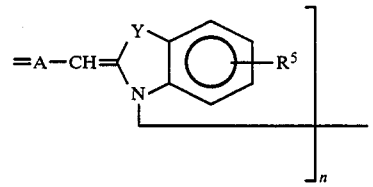

wherein Y is

—C(CH₃)₂,

—S—, —Se—, or —O—,

A is

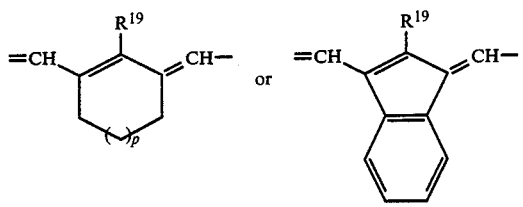

in which R¹⁹ is alkyl, —Cl, amino, alkyl (C₁ to C₄) substituted amino, phenyl, or cyclic amino, and p is 0 or 1, R⁴ and R⁵ independently are —H, C₆H₅SO₂—, or CF₃SO₂—, W is a dye anion, m is an integer 1 to 20, and n is an integer 2 to 10,000.

2. The polymeric tricarbocyanine dye according to claim 1 prepared by reacting a bis-heterocyclic quaternary salt having the formula:

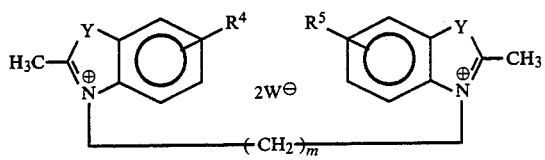

wherein Y, W, R⁴, R⁵, and m are as previously defined, with a pentamethine bridging compound.

3. The polymeric dye according to claim 1 which absorbs radiation in the range of 700–900 nm.

4. The polymeric dye according to claim 1 which absorbs radiation in the infrared range.

5. The polymeric dye according to claim 1 which absorbs radiation in the range of 800–850 nm.

6. The polymeric dye according to claim 1 which is capable of undergoing thermoplastic deformation by a focused laser beam.

7. The polymeric dye according to claim 1 which when a layer of thickness in the range of 0.1 to 100 micrometers has an absorption coefficient in the range of 10 to 10⁵ cm⁻¹.

8. The polymeric dye according to claim 1 which is film-forming.

9. The polymeric tricarbocyanine dye according to claim 2 wherein said pentamethine bridging compound is selected from the group consisting of

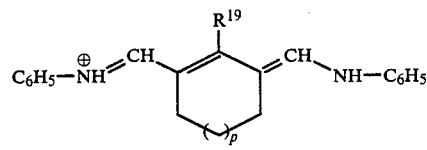

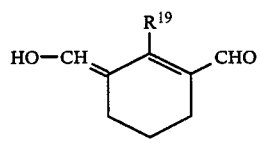

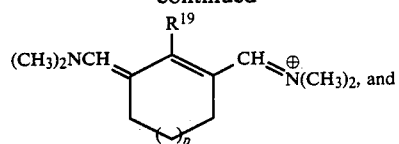

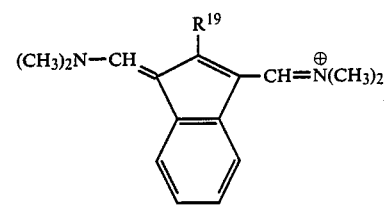

wherein R¹⁹ is alkyl of C₁–C₈, —Cl, amino, alkyl (C₁ to C₄) substituted amino, phenyl, or cyclic amino, p is 0 or 1, R⁴ and R⁵ independently are —H, C₆H₅SO₂⁻, or CF₃SO₂—, Y is

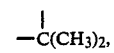

—S—, —Se— or —O—, m is an integer 1 to 20, and

W is a dye anion.

10. The dye according to claim 9 wherein said pentamethine bridging compound is

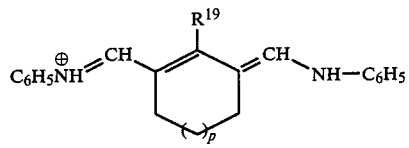

wherein p is 0 or 1, and

R¹⁹ is alkyl, —Cl, amino, alkyl (C₁ to C₄) substituted amino, or cyclic amino.

11. The dye according to claim 9 wherein said pentamethine bridging compound is

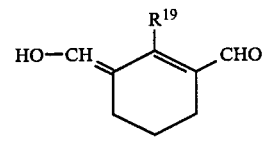

wherein R¹⁹ is alkyl, —Cl, amino, alkyl (C₁ to C₄) substituted amino, or cyclic amino.

12. The dye according to claim 9 wherein said pentamethine bridging compound is

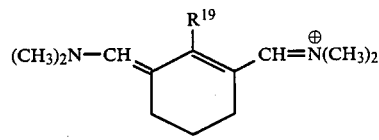

wherein R¹⁹ is alkyl, —Cl, amino, alkyl (C₁ to C₄) substituted amino, or cyclic amino.

13. The dye according to claim 9 wherein said pentamethine bridging compound is

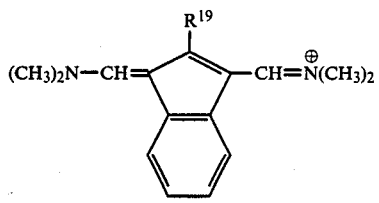
wherein $R^{19}$ is alkyl, —Cl, amino, alkyl ($C_1$ to $C_4$) substituted amino, or cyclic amino.
14. The polymeric dye having the formula
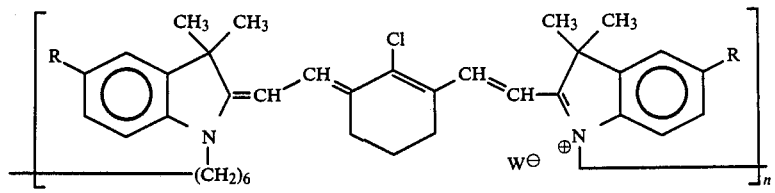
wherein R is —H or $C_6H_5SO_2$—,
W is $I^-$ or $ClO_4^-$, and
n is an integer of 5 to 10,000.

UNITED STATES PATENT AND TRADEMARK OFFICE
CERTIFICATE OF CORRECTION

PATENT NO. : 4,739,029
DATED : April 19, 1988
INVENTOR(S) : Mohamed A. Elmasry

It is certified that error appears in the above-identified patent and that said Letters Patent is hereby corrected as shown below:

Col. 2, line 34, delete "≠thermoplastic" and insert therefor -- "thermoplastic --.

Col. 11, line 1, delete "-24°C" and insert therefor -- -244°C --.

Signed and Sealed this

Twenty-third Day of May, 1989

Attest:

DONALD J. QUIGG

*Attesting Officer*     Commissioner of Patents and Trademarks